(12) United States Patent
Song et al.

(10) Patent No.: US 11,046,349 B2
(45) Date of Patent: Jun. 29, 2021

(54) METHOD OF DRIVING A SLIDING TOOL ON ICE-SURFACE

(71) Applicant: Ping Lin, Qinghai (CN)

(72) Inventors: Wenli Song, Guangzhou (CN); Zhipeng Li, Guangzhou (CN); Ping Zhang, Guangzhou (CN); Ruizhu Yang, Guangzhou (CN); Bowen Ning, Guangzhou (CN); Yangyang Yu, Guangzhou (CN); Yuxin Zhang, Guangzhou (CN); Bing Han, Guangzhou (CN)

(73) Assignee: Ping Lin, Qinghai (CN)

( * ) Notice: Subject to any disclaimer, the term of this patent is extended or adjusted under 35 U.S.C. 154(b) by 0 days.

(21) Appl. No.: 16/778,494

(22) Filed: Jan. 31, 2020

(65) Prior Publication Data
US 2020/0247455 A1    Aug. 6, 2020

(30) Foreign Application Priority Data

Feb. 2, 2019    (CN) .......................... 201910106062.3

(51) Int. Cl.
*B62B 11/00*    (2006.01)
*B62B 15/00*    (2020.01)
(Continued)

(52) U.S. Cl.
CPC ............ *B62B 15/008* (2013.01); *B62B 11/00* (2013.01); *B62B 17/063* (2013.01); *B62M 1/14* (2013.01); *B62M 1/36* (2013.01); *B62M 9/02* (2013.01); *B62B 13/06* (2013.01); *B62B 2202/42* (2013.01); *B62B 2301/33* (2013.01)

(58) Field of Classification Search
CPC ..... B62B 15/008; B62B 11/00; B62B 17/063; B62B 13/06; B62B 2202/42; B62B 2301/33; B62B 17/63; B62M 1/14; B62M 1/36; B62M 9/02
See application file for complete search history.

(56) References Cited

U.S. PATENT DOCUMENTS 3,760,905 A * 9/1973 Dower ...................... F03G 5/00
                                                    185/2
6,257,607 B1 * 7/2001 Franks ..................... B62M 1/14
                                                    280/242.1
(Continued)

*Primary Examiner* — John D Walters
(74) *Attorney, Agent, or Firm* — Nelson Mullins Riley & Scarborough LLP; Kongsik Kim, Esq.

(57) ABSTRACT

A sliding method on ice-surface aims at solve the problems of power output and poor durability and the difficulty in large-scale promotion. An ice-surface sliding tool includes a seat board, a U-shaped rod, sliding plates, H-shaped connecting frames, a pushing device, a hand-operated chain wheel and a reversing gear. One end of the upper end surface of the seat board is provided with a backrest. The U-shaped rod is provided on the side wall of the other end of the seat board. The lower end of the seat board is symmetrically provided with two sliding plates in parallel to each other. The sliding plates are connected with the lower end surface of the seat board through the H-shaped connecting frames. The pushing device is rotationally provided between the two H-shaped connecting frames. The hand-operated chain wheel is on the upper end of the U-shaped rod through a support bar.

7 Claims, 7 Drawing Sheets

(51) Int. Cl.
*B62B 17/06* (2006.01)
*B62M 1/14* (2006.01)
*B62M 1/36* (2013.01)
*B62M 9/02* (2006.01)
*B62B 13/06* (2006.01)

(56) References Cited

U.S. PATENT DOCUMENTS

| | | | |
|---|---|---|---|
| 6,511,079 B1 * | 1/2003 | Charles, Sr. | B62K 13/00 |
| | | | 180/190 |
| 8,888,116 B2 * | 11/2014 | Lasher, III | B62M 1/14 |
| | | | 280/276 |
| 2003/0122330 A1 * | 7/2003 | Nelson | B62K 3/005 |
| | | | 280/12.1 |
| 2006/0226628 A1 * | 10/2006 | Lindsay | B62K 21/00 |
| | | | 280/250 |
| 2019/0002055 A1 * | 1/2019 | Reed | B62K 3/005 |

\* cited by examiner

METHOD OF DRIVING A SLIDING TOOL ON ICE-SURFACE

CROSS-REFERENCE TO RELATED APPLICATIONS

The present application claims the priority of Chinese Application No. 201910106062.3, filed Feb. 2, 2019, which is incorporated herein by reference in its entirety.

TECHNICAL FIELD

The invention relates to a technical field of sliding tools, and particularly relates to a sliding method on ice-surface.

RELATED ART

The northern China is a world of ice and snow in the winter. The ice and snow are unique wealth for Chinese northerners. The northerners love the ice and snow, and create a special ice and snow culture from a cultural perspective. Making full use of ice and snow can vigorously develop the ice and snow tourism. How to bring the tourists enjoy the ice and snow is a key issue. Ice sliding tools allow the tourists to enjoy the fun of ice sliding and feel the charm of the ice and snow. However, the conventional sliding tools, such as ice sledges, need to be brazed on the ice surface with a sharp iron at one end and be propelled by human force; this requires certain skills and is dangerous. Ice sledges have poor dynamics, short gliding distances, and are unable to glide for long periods of time, thus are unfavorable to large-scale promotion. There is also sliding apparatus powered by motors to provide power output, but there are problems with how the sliding apparatus is powered. The sliding apparatus cannot store electricity in cold weather, have a short power supply time, and has poor power durability. The sliding apparatus is also unfavorable to large-scale promotion. Therefore, a sliding tool on ice-surface is particularly needed to solve the power output problem.

SUMMARY

The present invention overcomes the above deficiencies in the prior art, and provides a sliding method on ice-surface. The present invention combines a seat board, a U-shaped rod, sliding plates, H-shaped connecting frames, a pushing device, a hand-operated chain wheel and a reversing gear to achieve continuous and effective power output, and to reduce resistance of the sliding tool self in sliding phase, thereby achieving the effects of long sliding distance, strong durability and easy to promote. The invention is simple in structure, reasonable in design, and can at least solve problems of power output, poor durability and the difficulty of large-scale promotion of the conventional sliding tools.

The technical solutions of the present invention are as follows.

An ice-surface sliding tool, comprising:

a seat board, a U-shaped rod, a sliding plates, a H-shaped connecting frames, a pushing device, a hand-operated chain wheel, and a reversing gear; one end of the upper end surface of the seat board is provided with a backrest; the U-shaped rod is provided on the side wall of the other end of the seat board; the lower end of the seat board is symmetrically provided with two sliding plates in parallel to each other, and the sliding plates are connected with the lower end surface of the seat board through the H-shaped connecting frames; the pushing device is rotationally provided between the two H-shaped connecting frames; the hand-operated chain wheel is provided on the upper end of the U-shaped rod through a support bar, and is connected with the pushing device through a chain running through the U-shaped rod and matching with the reversing gear; a manual counterclockwise rotation of the hand-operated chain wheel drives the pushing device to provide power for the sliding tool during acceleration phase; a manual clockwise rotation of the hand-operated chain wheel eliminates a resistance caused by the pushing device for the sliding tool during sliding phase;

the pushing device includes a rotating shaft, a chain wheel, rotating devices and positioning devices; the rotating shaft is rotationally provided on the two H-shaped connecting frames; positive and negative external threads are symmetrically provided on the rotating shaft; the chain wheel, the rotating devices and the positioning devices are arranged on the rotating shaft; both ends of the chain wheel are outwardly provided with the rotating devices and the positioning devices in turn and in a symmetrical manner; one end of the positioning device is connected to the H-shaped connecting frame, and the other end is matched with the rotating device; the rotating device rotates counterclockwise with the rotating shaft, and cannot rotate clockwise with the rotating shaft; the distance between the two positioning devices is controlled by controlling the rotation direction of the rotating shaft; the counterclockwise rotation of the rotating shaft increases the distance between the two symmetrically positioning devices, and the distance-increased positioning devices are matched with the rotating devices to enhance force between the rotating devices and the ice surface so as to provide power for the sliding tool; the clockwise rotation of the rotating shaft decreases the distance between the two symmetrically provided positioning devices to, and the distance-decreased positioning devices are matched with the rotating devices to eliminate the force between the rotating devices and the ice surface so as to reduce resistance for the sliding tool.

Preferably, the rotating device includes a disk, a ratchet, limiters, a cylinder, connecting plates, an annular disk, transmission rods, trapezoidal limiting blocks, first pressure springs and friction members; the disk is provided on the rotating shaft through a bearing; the ratchet is provided between the disk and the rotating shaft; two limiters are symmetrically provided around the center of the inner side wall of the disk and are matched with the ratchet; the outer side wall of the disk is connected to the annular disk through the cylinder, a plurality of connecting plates, and rod shafts; the plurality of connecting plates are provided on the outer side wall of the disk to form an annular array; a plurality of through holes that are formed as an array on the side wall of the cylinder correspond with through holes that are provided on the connecting plates; one end of the transmission rod is connected to the trapezoidal limiting block, the other end passes through the first pressure spring to connect a friction member through a hinge seat; the friction member is rotationally provided on the rod shaft. One end of the first pressure spring is connected to the connecting plate, and the other end of the first pressure spring is connected to a limiting piece on the transmission rod.

Preferably, the positioning device includes a tapered base, limiting rods and a return spring; the center of the tapered base is provided with a through chamber; the through chamber has internal threads inside; the through chamber symmetrically has limiting chambers on each side; each limiting rod which is symmetrically provided in parallel to each other has the H-shaped connecting frame at one end and the limiting chamber at the other end; the outer side wall of the tapered base is connected to the H-shaped connecting frame through the return spring on the rotating shaft, and the inclined side walls of the tapered base abut against the trapezoidal limiting block.

Preferably, the limiting member includes a fixing block, a connecting rod, a second pressure spring, a blocking piece and a limiting block; the fixing block is provided on the side wall of the disk and has a groove; the upper end of the groove has a through hole; the connecting rod is movable in the groove and the through hole; the other end of the connecting rod extends through the pressure spring and the blocking piece in the groove and is connected to the limiting block which is matched with the ratchet; each end of the second pressure spring is connected with the upper wall of the groove and the blocking piece respectively.

Preferably, the friction member includes a slat, limiting slats, a U-shaped frame and third pressure springs; the rod shaft is rotationally provided with the slat and the limiting slats; the limiting slats are symmetrical on each side wall of the slat; the back-side wall of the slat is connected to the transmission rod through the hinge seat; the U-shaped frame is movable between the disk and the annular disk; both vertical side walls of the U-shaped frame are provided with strip-shaped chambers in which the limiting slats are movable; the front side wall of the slat is connected to the bottom inner wall of the U-shaped frame by the symmetrically third pressure springs.

A rotating device for the ice-surface sliding tool includes a disk, a ratchet, limiters, a cylinder, connecting plates, an annular disk, transmission rods, trapezoidal limiting blocks, first pressure springs and friction members; the disk is provided on the rotating shaft through a bearing; the ratchet is provided between the disk and the rotating shaft; two limiters are symmetrically provided around the center of the inner side wall of the disk; the limiters are matched with the ratchet; the outer side wall of the disk is connected to the annular disk through the cylinder, a plurality of connecting plates, and rod shafts; the plurality of connecting plates are provided on the outer side wall of the disk to form an annular array. A plurality of through holes that are formed as an array on the side wall of the cylinder correspond with through holes that are provided on the connecting plates. One end of the transmission rod is connected to the trapezoidal limiting block, and the other end passes through the first pressure spring and is connected to the friction member through a hinge seat; the friction member is rotationally provided on the rod shaft. One end of the first pressure spring is connected to the connecting plate, and the other end of the first pressure spring is connected to a limiting piece on the transmission rod.

A positioning device for the ice-surface sliding tool includes a tapered base, limiting rods and a return spring; the center of the tapered base is provided with a through chamber; the through chamber has internal threads inside; the through chamber symmetrically has limiting chambers on each side. Each limiting rod which is symmetrically provided in parallel to each other has an H-shaped connecting frame on one end and the limiting chamber on the other end; the outer side wall of the tapered base is connected to the H-shaped connecting frame through the return spring on the rotating shaft, and the inclined side walls of the tapered base abut against the trapezoidal limiting block.

A limiting member for the ice-surface sliding tool includes a fixing block, a connecting rod, a second pressure spring, a blocking piece and a limiting block; the fixing block is provided on the side wall of the disk and has a groove; the upper end of the groove has a through hole; the connecting rod is movable in the groove and the through hole; the other end of the connecting rod extends through the pressure spring and the blocking piece in the groove and is connected to the limiting block which is matched with a ratchet. Each end of the second pressure spring is connected with the upper wall of the groove and the blocking piece respectively.

A friction member for the ice-surface sliding tool includes a slat, limiting slats, a U-shaped frame and third pressure springs; the rod shaft is rotationally provided with the slat and the limiting slats; the limiting slats are symmetrical on each side wall of the slat; the back-side wall of the slat is connected to a transmission rod through a hinge seat; the U-shaped frame is movable between a disk and an annular disk. Both vertical side walls of the U-shaped frame are provided with strip-shaped chambers in which the limiting slats are movable; the front side wall of the slat is connected to the bottom inner wall of the U-shaped frame by the symmetrical third pressure springs.

A sliding method on ice-surface includes the following steps:

step a): placing a tool on an ice surface, making a user sit on the seat board with two feet off the ice surface and two hands holding a rotating rod of a hand-operated chain wheel;

step b): counterclockwise rotating and accelerating the hand-operated chain wheel by hands to drive a chain, rotating counterclockwise and accelerating a chain wheel via reversing action of a reversing gear to rotate counterclockwise a ratchet via a rotating shaft, rotating counterclockwise and accelerating a disk under limitation of limiters to the ratchet, and driving transmission rods and friction members to rotate counterclockwise via a cylinder, connecting plates and an annular disk;

step c): abutting internal threads of a through chamber in a tapered base against external threads provided on a rotating shaft which has not yet rotated through the tension of a return spring in order to restrict the tapered base to moving toward an H-shaped connecting frame, in which the external threads of the rotating shaft are matched with the internal threads of the through chamber when the rotating shaft is rotated counterclockwise, moving the tapered base toward the H-shaped connecting frame along limiting rods until the internal threads of the through chamber arrive at the other side of the external threads of the rotating shaft and abut against each other under the return spring, approaching trapezoidal limiting blocks to the rotating shaft under the disk and first pressure springs when the tapered base moves toward the H-shaped connecting frame, making the friction members rotate around rod shafts and friction ends of the friction members be unscrewed between the disk and the annular disk, rotating the friction members to generate force with the ice surface via the outermost ends of the unscrewed friction members through the counterclockwise rotation of the rotating shaft, in which the rotation of the friction members provides power for the tool and the speed of a sliding tool gradually increases from 0 to accelerate the sliding when the linear speed of the friction members with the ice surface is greater than the sliding speed of the tool;

step d): continue rotating counterclockwise the friction members with the disk and the annular disk by inertia and generating the force with the ice surface when the tool is needed to slide after the speed increases for a period of time, rotating clockwise the hand-operated chain wheel by hands to drive the chain and rotate clockwise the chain wheel through the reversing action of the reversing gear when the rotation of the friction members stops to provide power for the tool but provide resistance instead and the linear speed of the friction members during the action with the ice surface is less than the sliding speed of the tool, and the chain wheel rotating clockwise the ratchet via the rotating shaft, in which the limiters cannot restrict the ratchet to rotate clockwise, and the disk and the friction members continue to rotate counterclockwise by inertia;

step e): rotating clockwise the rotating shaft whose external threads are matched with the internal threads of the through chamber when the internal threads of the through chamber in the tapered base abut against the external threads on the rotating shaft via the pressure of the return spring, moving the tapered base away from the H-shaped connecting frame along the limiting rods until the internal threads of the through chamber arrive at the other side of the external threads of the rotating shaft and abut against each other under the return spring, moving the trapezoidal limiting blocks away from the rotating shaft under the disk and the first pressure spring when the tapered base moves away from the H-shaped connecting frame, making that the friction member rotate around the rod shafts, and the friction ends of the friction members be screwed between the disk and the annular disk, thereby releasing force between the rotating friction member and the ice surface, and eliminating the resistance for the sliding tool to prolong the sliding time; and step f): rotating counterclockwise the hand-operated chain wheel by hands when needs to decelerate the sliding tool needs in emergency to drive the chain and rotate counterclockwise the chain wheel through the reversing action of the reversing gear, the chain wheel rotating counterclockwise the ratchet via the rotating shaft; rotating counterclockwise the disk under the limitation of limiters to the ratchet, rotating counterclockwise the transmission rods and the friction members through the cylinder, the connecting plates and the annular disk, rotating counterclockwise the rotating shaft whose external threads are matched with the internal threads of the through chamber, moving the tapered base toward the H-shaped connecting frame along the limiting rods until the internal threads of the through chamber arrive at the other side of the external threads of the rotating shaft as well as the internal threads of the through chamber and the external threads of the rotating shaft abut against each other under the action of the return spring, approaching the trapezoidal limiting blocks to the rotating shaft under the action of the disk and the first pressure spring when the tapered base moves toward the H-shaped connecting frame, and making the friction member rotate around the rod shaft and the friction ends of the friction members be unscrewed between the disk and the annular disk, thereby generating the force with the ice surface, in which when the linear speed of the friction members during the action with the ice surface is less than the sliding speed of the tool by rotating the hand-operated chain wheel, and the rotation of the friction members stops to provide power for the tool but provide resistance instead to decelerate the sliding tool.

Preferably, the sliding method on ice-surface is implemented on the ice-surface sliding tool.

An accelerated sliding method on ice-surface, including: rotating counterclockwise a hand-operated chain wheel in an accelerated speed by hands to drive a chain and rotate counterclockwise a chain wheel in an accelerated speed through reversing action of a reversing gear, the chain wheel rotating counterclockwise a ratchet in an accelerated speed via a rotating shaft, is rotated counterclockwise a disk in an accelerated speed under limitation of limiters to the ratchet, and rotating counterclockwise the transmission rods and the friction members in an accelerated speed through a cylinder, connecting plates and an annular disk.

An accelerated sliding method on ice-surface, including: abutting internal threads of a through chamber in a tapered base against external threads on a rotating shaft which has not yet rotated through tension of a return spring in order to restrict the tapered base to move toward an H-shaped connecting frame, in which the external threads of the rotating shaft are matched with the internal threads of the through chamber when the rotating shaft is rotated counterclockwise, moving the tapered base toward the H-shaped connecting frame along limiting rods until the internal threads of the through chamber arrive at the other side of the external threads of the rotating shaft and abut against each other under the return spring, approaching trapezoidal limiting blocks to the rotating shaft under the disk and the first pressure springs when the tapered base moves toward the H-shaped connecting frame, making the friction members rotate around rod shafts and friction ends of the friction members be unscrewed between the disk and the annular disk, rotating the friction members to generate force with an ice surface via the outermost ends of the unscrewed friction members through counterclockwise rotation of the rotating shaft, in which rotation of the friction members provides power for the tool and the speed of a sliding tool gradually increases from 0 to accelerate the sliding when the linear speed of the friction members with the ice surface is greater than the sliding speed of the tool.

Preferably, the accelerated sliding method on ice-surface is implemented on the ice-surface sliding tool.

An inertial sliding method on ice-surface, including: continue rotating counterclockwise friction members with a disk and an annular disk by inertia and generating force with an ice surface, rotating clockwise a hand-operated chain wheel by hands to drive a chain and rotate clockwise a chain wheel through reversing action of a reversing gear when a linear speed of the friction members during action with the ice surface is less than that of a sliding speed of a tool and the rotation of the friction members stops to provide power for the tool but provide resistance instead, and the chain wheel driving a ratchet to rotate clockwise through a rotating shaft, in which limiters cannot restrict the ratchet from rotating clockwise, and the disk and the friction members continue to rotate counterclockwise due to the inertia.

An inertial sliding method on ice-surface, including: abutting internal threads of a through chamber in a tapered base against external threads on a rotating shaft through pressure action of a return spring, rotating clockwise the rotating shaft whose external threads are matched with the internal threads of the through chamber, moving the tapered base away from an H-shaped connecting frame along limiting rods until the internal threads of the through chamber arrive at the other side of the external threads of the rotating shaft and abut against each other under the return spring, moving the trapezoidal limiting blocks away from the rotating shaft under the action of a disk and first pressure springs when the tapered base moves away from the H-shaped connecting frame, making the friction members rotate around rod shafts and friction ends of the friction members be screwed between the disk and the annular disk, thereby releasing force action between the rotating friction members and the ice surface, and eliminating resistance for the sliding tool to prolong sliding time.

Preferably, the inertial sliding method on ice-surface is implemented on the ice-surface sliding tool.

An emergent deceleration method for ice-surface sliding, including: rotating counterclockwise a hand-operated chain wheel by hands to drive a chain and rotate counterclockwise a chain wheel through reversing action of a reversing gear, the chain wheel driving a ratchet to rotate counterclockwise through a rotating shaft, rotating counterclockwise a disk under limitation of limiters to the ratchet, rotating counterclockwise transmission rods and friction members through a cylinder, connecting plates and an annular disk, rotating counterclockwise the rotating shaft whose external threads are matched with internal threads of a through chamber, moving a tapered base toward an H-shaped connecting frame along limiting rods until the internal threads of the through chamber arrive at the other side of the external threads of the rotating shaft and abut against each other under action of a return spring, approaching trapezoidal limiting blocks to the rotating shaft under action of the disk and first pressure springs when the tapered base moves toward the H-shaped connecting frame, and making the friction members rotate around rod shafts and friction ends of the friction members be unscrewed from between the disk and the annular disk, thereby generating force with an ice surface, in which the rotation of the friction members stops to provide power for a tool but provide resistance instead to decelerate a sliding tool and a linear speed of the friction members during action with the ice surface is less than that of a sliding speed of the tool by rotating the hand-operated chain wheel.

Preferably, the emergent deceleration method for ice-surface sliding is implemented on the ice-surface sliding tool.

The beneficial effects of the present invention are as follows.

1) The user needs to rotate counterclockwise the hand-operated chain wheel to accelerate and rotate counterclockwise the pushing device through the chain when driving the sliding tool. The size of the pushing device becomes larger to abut against the ice surface. The force direction on the pushing device from the ice surface is going forward to push the sliding tool to slide forward. The acceleration and rotation of the hand-operated chain wheel is needed to be stopped, or the user needs to actively stop the acceleration and rotation of the hand-operated chain wheel when the speed increases by a certain degree. The pushing device can continue to rotate counterclockwise by inertia when the hand-operated chain wheel stops to accelerate the pushing device. The force direction on the pushing device from the ice surface is going forward to continue to push the sliding tool to slide. The force direction on the on the pushing device from the ice surface is going backward to provide resistance to the sliding of the tool when the pushing device stops to provide power for the sliding tool. At this time, manually rotating clockwise the hand-operated chain wheel is to reduce the size of the pushing device by the chain, so that the pushing device is separated from the ice surface. The acting force between the pushing device and the ice surface eliminates so that the sliding tool slides further for a longer time during the sliding phase. Therefore, the user can fully enjoy the fun of sliding on the ice. Meanwhile, the manual operation has durable power, and is safe and reliable. This is fully suitable for the development of the ice and snow tourism industry, and can be promoted on a large scale.

2) The user of the present invention can effectively combine the characteristics of the sliding tool that the manual counterclockwise rotation of the hand-operated chain wheel drives the pushing device to provide power for the sliding tool during the acceleration phase while the manual clockwise rotation of the hand-operated chain wheel can eliminate the resistance of the pushing device during the sliding phase. The hand-operated chain wheel can be rotated counterclockwise with hands to drive the chain when in emergency and requiring deceleration, then the reversing action of the reversing gear provides resistance for the sliding tool and reduces the speed to deal with emergency situations.

3) The manual control of the hand-operated chain wheel provides power and eliminates resistance for the sliding tool, takes the place of the power forms such as electric power and internal combustion engine, solves the problems of severe power consumption, electric leakage, and the charging for a large number of sliding tools in cold weather, and solves the exhaust emission problem of the internal combustion engine. The user of the present sliding tool can manually control the speed as desired. Thus, the present invention achieves the sports effect and fully enjoying the sliding fun on the ice.

4) According to the present invention, the ratchet is fixed to the rotating shaft, and the rotating shaft is rotated counterclockwise to drive the ratchet to rotate counterclockwise, the limiters restrict the ratchet to rotating counterclockwise, so that the limiters rotate with the ratchet and the disk rotates counterclockwise. Two limiters are matched with the ratchet, and the cost is saved with ensuring the stability. The clockwise rotation of the rotating shaft drives the ratchet to rotate clockwise. The limiters cannot restrict the ratchet to rotating clockwise, and cannot be rotate with the ratchet. The hand-operated chain wheel is rotated clockwise to eliminate the force between the rotating device and the ice surface when entering the sliding phase after completing the acceleration phase. Due to the limiters and the ratchet, the hand-operated chain wheel can rotate clockwise from counterclockwise, and it is not necessary to overcome the impact force caused by the ratchet that continues to rotate counterclockwise due to the inertia, so that the hand-operated chain wheel is quickly and effortlessly adjusted from counterclockwise to clockwise.

5) The friction member of the present invention rotates the slat to around the rod shaft by the transmission rod through the hinge seat. The positions of the trapezoidal limiting block and the transmission rod are determined after the position of the tapered base is stabilized. The transmission rod fixes the position and angle of the slat. It is possible to control the U-shaped frame screwed or unscrewed between the disk and the annular disk. The distance to the ice surface first becomes smaller and then becomes larger before contacting the ice surface when the U-shaped frame is unscrewed between the disk and the annular disk. Both vertical side walls of the U-shaped frame are provided with strip-shaped chambers. The limiting slats are matched with the strip-shaped chambers to enable the U-shaped frame to move free along the direction of the slat in order to adapt to the change of the distance between the friction member and the ice surface. Meanwhile, the distance change between the friction member and the ice surface and the effect of the force with the ice surface are assured under the action of the third pressure springs. Furthermore, the effect of the force exists from contacting the ice surface until separating from the ice surface, which provides maximum power for the sliding tool.

Figure 1:
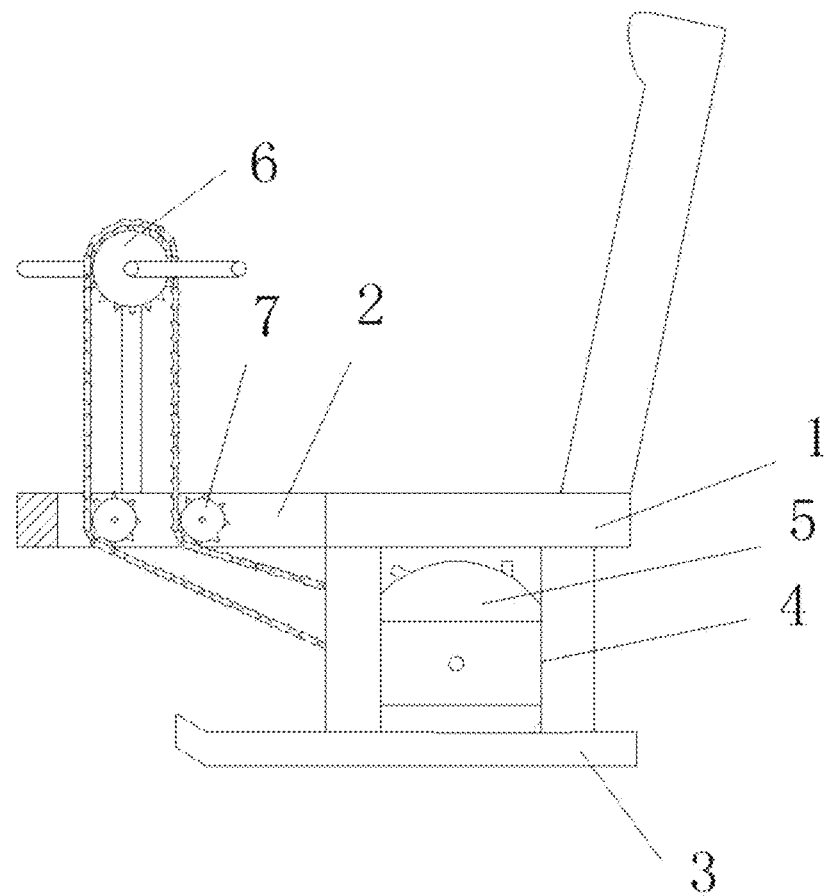
FIG. 1 is a structural schematic view of an ice-surface sliding tool according to the present invention.
Figure 2:
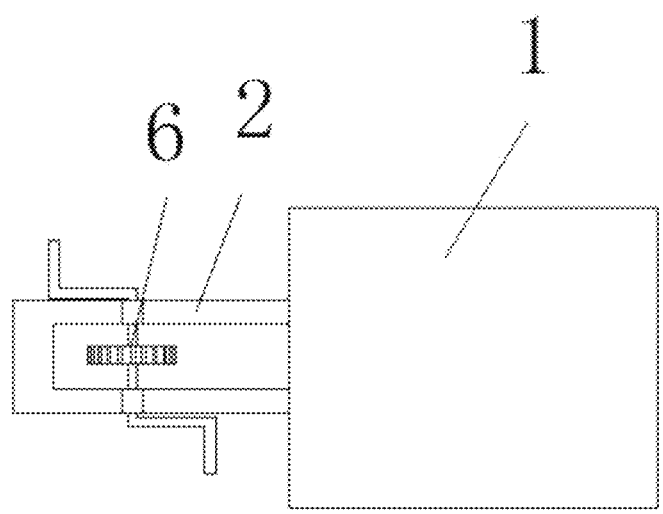
FIG. 2 is a plan view of a combination of a U-shaped rod, a seat board and a hand-operated chain wheel.

Among the drawings: 1—seat board, 2—U-shaped rod, 3—sliding plate, 4—H-shaped connecting frame, 5—pushing device, 5-1—rotating shaft, 5-2—chain wheel, 5-3—rotating device, 5-3-1—disk, 5-3-2—ratchet, 5-3-3—limiter, 5-3-3-1—fixing block, 5-3-3-2—connecting rod, 5-3-3-3—second pressure spring, 5-3-3-4—blocking piece, 5-3-3-5—limiting block, 5-3-4—cylinder, 5-3-5—connecting plate, 5-3-6—annular disk, 5-3-7—transmission rod, 5-3-8—trapezoidal limiting block, 5-3-9—first pressure spring, 5-3-10—friction member, 5-3-10-1—slat, 5-3-10-2—limiting slat, 5-3-10-3—U-shaped frame, 5-3-10-4—strip-shaped chamber, 5-3-10-5—third pressure spring, 5-4—positioning device, 5-4-1—tapered base, 5-4-2—through chamber, 5-4-3—limiting chamber, 5-4-4—limiting rod, 5-4-5—return spring, 6—hand-operated chain wheel, and 7—reversing gear.

DETAILED DESCRIPTION

Embodiment 1

As shown in FIGS. 1, 2, 3 and 5, an ice-surface sliding tool disclosed by the present embodiment includes a seat board 1, a U-shaped rod 2, sliding plates 3, H-shaped connecting frames 4, a pushing device 5, a hand-operated chain wheel 6 and a reversing gear 7. One end of the upper end surface of the seat board 1 is provided with a backrest, the U-shaped rod 2 is provided on the side wall of the other end of the seat board 1. The lower end of the seat board 1 is symmetrically provided with two sliding plates 3 in parallel to each other, and the sliding plates 3 are connected with the lower end surface of the seat board 1 through the H-shaped connecting frames 4. The pushing device 5 is rotationally provided between the two H-shaped connecting frames 4. The hand-operated chain wheel 6 is provided on the upper end of the U-shaped rod 2 through a support bar, and is connected with the pushing device 5 through a chain which goes through the U-shaped rod 2 and is matched with the reversing gear 7. The manual counterclockwise rotation of the hand-operated chain wheel 6 drives the pushing device 5 to provide power for the sliding tool during the acceleration phase, and the manual clockwise rotation of the hand-operated chain wheel 6 eliminates resistance caused by the pushing device 5 for the sliding tool during a sliding phase.

The user needs to rotate counterclockwise the hand-operated chain wheel 6 faster when driving the sliding tool. The phase in which a speed of the sliding tool gradually increases from 0 is defined as the acceleration phase. In this phase, a linear speed of the rotation of the pushing device 5 is greater than the sliding speed of the sliding plates 3. The pushing device 5 is rotated counterclockwise by the chain. The size of the pushing device 5 becomes larger to abut against the ice surface. The force direction on the pushing device 5 from the ice surface is going forward to push the sliding tool to slide forward. The phase, during which the speed increases by a certain degree, the acceleration and rotation of the hand-operated chain wheel 6 is needed to be stopped, or the user needs to actively stop the acceleration and rotation of the hand-operated chain wheel 6, is defined as the sliding phase. The pushing device 5 can continue to rotate counterclockwise due to inertia when the hand-operated chain wheel 6 stops to accelerate the pushing device 5. The force direction on the pushing device 5 on the ice surface is going forward to continue to push the sliding tool to slide. The linear speed of the pushing device 5 decreases while the speed of the sliding tool gradually increases. The pushing device 5 stops to provide power for the sliding tool when the speed of the sliding tool is greater than the linear speed of the pushing device 5. The force direction on the pushing device 5 from the ice surface is going backward to provide resistance for the sliding of the sliding tool, so that the device cannot fully and effectively slide.

The hand-operated chain wheel 6 is manually rotated clockwise, and the size of the pushing device 5 is reduced by the chain, so that the pushing device 5 is separated from the ice surface. The acting force between the pushing device 5 and the ice surface eliminates so that the sliding tool slides further for a longer time during the sliding phase and the user can fully enjoy the fun of sliding on the ice.

The user can effectively combine the characteristics of the sliding tool that the manual counterclockwise rotation of the hand-operated chain wheel 6 drives the pushing device 5 to provide power for the sliding tool during the acceleration phase while the manual clockwise rotation of the hand-operated chain wheel 6 can eliminate the resistance of the pushing device 5 during the sliding phase. The hand-operated chain wheel 6 can be rotated counterclockwise with hands when in emergency and requiring deceleration to drive the chain and provide resistance for the sliding tool through the reversing action of the reversing gear 7.

The manual control of the hand-operated chain wheel 6 provides power and eliminates the resistance for the sliding tool, takes the place of the power forms such as electric power and internal combustion engine, solves the problems of severe power consumption, electric leakage, and the charging for a large number of sliding tools in cold weather, and solves the exhaust emission problem of the internal combustion engine. The user of the present sliding tool can manually control the speed as desired. Thus, the present invention achieves the sports effect and fully enjoys the sliding fun on the ice. Moreover, the manual operation is safe and reliable.

The pushing device 5 includes a rotating shaft 5-1, a chain wheel 5-2, rotating devices 5-3 and positioning devices 5-4. The rotating shaft 5-1 is rotationally provided on the two H-shaped connecting frames 4. The positive and negative external threads are symmetrically provided on the rotating shaft 5-1. The chain wheel 5-2, the rotating devices 5-3 and the positioning devices 5-4 are provided on the rotating shaft 5-1. Both ends of the chain wheel 5-2 are outwardly provided with the rotating devices 5-3 and the positioning devices 5-4 in turn and in a symmetrical manner. One end of the positioning device 5-4 is connected to the H-shaped connecting frame 4, and the other end is matched with the rotating device 5-3. The rotating device 5-3 rotates counterclockwise with the rotating shaft 5-1, and cannot rotate clockwise with the rotating shaft 5-1. The distance between the two positioning devices 5-4 is controlled by controlling the rotation direction of the rotating shaft 5-1. The counterclockwise rotation of the rotating shaft 5-1 increases the distance between the two symmetrical positioning devices 5-4. The distance-increased positioning devices 5-4 are matched with the rotating devices 5-3 to enhance the force between the rotating devices 5-3 and the ice surface so as to provide power for the tool to slide. The clockwise rotation of the rotating shaft 5-1 decreases the distance between the two symmetrical positioning devices 5-4. The distance-decreased positioning devices 5-4 are matched with the rotating devices 5-3 to eliminate the force between the rotating devices 5-3 and the ice surface so as to reduce the resistance for the tool to slide.

Driving the chain wheel 5-2 by the hand-operated chain wheel 6 and the chain can rotate clockwise the rotating shaft 5-1 from counterclockwise. The rotating shaft 5-1 can rotate counterclockwise the rotating devices 5-3 and cannot rotate clockwise the rotating devices 5-3. Meanwhile, the counterclockwise rotation of the rotating shaft 5-1 can increase the distance between the two positioning devices 5-4 and the clockwise rotation of the rotating shaft 5-1 can decrease the distance between the two positioning devices 5-4. The distance-increase positioning device 5-4 can increase the radiuses of rotation of the rotating devices 5-3, which enables the outermost ends of the rotating devices 5-3 to abut against the ice surface and generate force to provide power for the sliding tool during the acceleration phase. The distance-decreased positioning device 5-4 can decrease the radiuses of rotation of the rotating devices 5-3, which enables the outermost ends of the rotating devices 5-3 to separate from the ice surface, and eliminate the force with the ice surface to decrease resistance for the sliding tool during the sliding phase.

Embodiment 2

Referring to FIGS. 3 to 8, the present embodiment is based on Embodiment 1, and the differences are that the rotating device 5-3 includes a disk 5-3-1, a ratchet 5-3-2, limiters 5-3-3, a cylinder 5-3-4, connecting plates 5-3-5, an annular disk 5-3-6, transmission rods 5-3-7, trapezoidal limiting blocks 5-3-8, first pressure springs 5-3-9 and friction members 5-3-10. The disk 5-3-1 is provided on the rotating shaft 5-1 through a bearing. The ratchet 5-3-2 is provided between the disk 5-3-1 and the rotating shaft 5-1. Two limiters 5-3-3 are symmetrically around the center of the inner side wall of the disk 5-3-1. The limiters 5-3-3 are matched with the ratchet 5-3-2. The outer side wall of the disk 5-3-1 is connected to the annular disk 5-3-6 through the cylinder 5-3-4, a plurality of connecting plates 5-3-5, and rod shafts. The plurality of connecting plates 5-3-5 are provided on the outer side wall of the disk 5-3-1 to form an annular array. A plurality of through holes that are formed as an array on the side wall of the cylinder 5-3-4 correspond with a plurality of through holes on the connecting plates 5-3-5. One end of the transmission rod 5-3-7 is connected to the trapezoidal limiting block 5-3-8, and the other end passes through a first pressure spring 5-3-9 and is connected to the friction member 5-3-10 through a hinge seat. The friction member 5-3-10 is rotationally provided on the rod shaft. One end of the first pressure spring 5-3-9 is connected to the connecting plate 5-3-5, and the other end of the first pressure spring 5-3-9 is connected to a limiting piece on the transmission rod 5-3-7.

The ratchet 5-3-2 is fixed to the rotating shaft 5-1 which is rotated counterclockwise to drive the ratchet 5-3-2 to rotate counterclockwise. The limiter 5-3-3 restricts the ratchet 5-3-2 to rotate counterclockwise, so that the limiter 5-3-3 rotates with the ratchet 5-3-2 and drives the disk 5-3-1 to rotate counterclockwise. Two limiters 5-3-3 are matched with the ratchet 5-3-2. Therefore, the cost is saved with ensuring stability. The clockwise rotation of the rotating shaft 5-1 rotates clockwise the ratchet 5-3-2. The limiters 5-3-3 cannot restrict the ratchet 5-3-2 from rotating clockwise, and cannot rotate with the ratchet 5-3-2. The hand-operated chain wheel 6 rotates clockwise to eliminate the force between the rotating device 5-3 and the ice surface when entering the sliding phase after completing the acceleration phase. The hand-operated chain wheel 6 can be rotated clockwise from counterclockwise due to the limiters 5-3-3 and the ratchet 5-3-2, and it is not necessary to overcome the impact force caused by the ratchet 5-3-2 that continues to rotate counterclockwise due to inertia, so that the hand-operated chain wheel 6 is quickly and effortlessly adjusted from counterclockwise to clockwise.

The counterclockwise rotation of the rotating shaft 5-1 can increase the distance between the two positioning devices 5-4 and the clockwise rotation of the rotating shaft 5-1 can decrease the distance between the two positioning devices 5-4. The distance-increased positioning devices 5-4 enables the trapezoidal limiting blocks 5-3-8 to move toward the rotation shaft 5-1 under the action of the first pressure springs 5-3-9. The trapezoidal limiting blocks 5-3-8 rotate the friction members 5-3-10 around the rod shafts through the transmission rods 5-3-7. Friction ends of the friction members (5-3-10) are unscrewed between the annular disk 5-3-6 and the disk 5-3-1, so that the friction members 5-3-10 abut against the ice surface and generate force to provide power for the sliding tool during the acceleration phase. The clockwise rotation of the rotating shaft 5-1 can decrease the distance between the two positioning devices 5-4, and the distance-increased positioning device 5-4 enables the trapezoidal limiting blocks 5-3-8 to move away from the rotating shaft 5-1 under the action of the first pressure springs 5-3-9. The trapezoidal limiting blocks 5-3-8 rotate the friction members 5-3-10 around the rod shafts. The friction ends of the friction members 5-3-10 are screwed between the annular disk 5-3-6 and the disk 5-3-1 to separate the outermost end of the friction members 5-3-10 from the ice surface and eliminate the force with the ice surface to reduce resistance for the sliding tool during the sliding phase.

Embodiment 3

Figure 3:
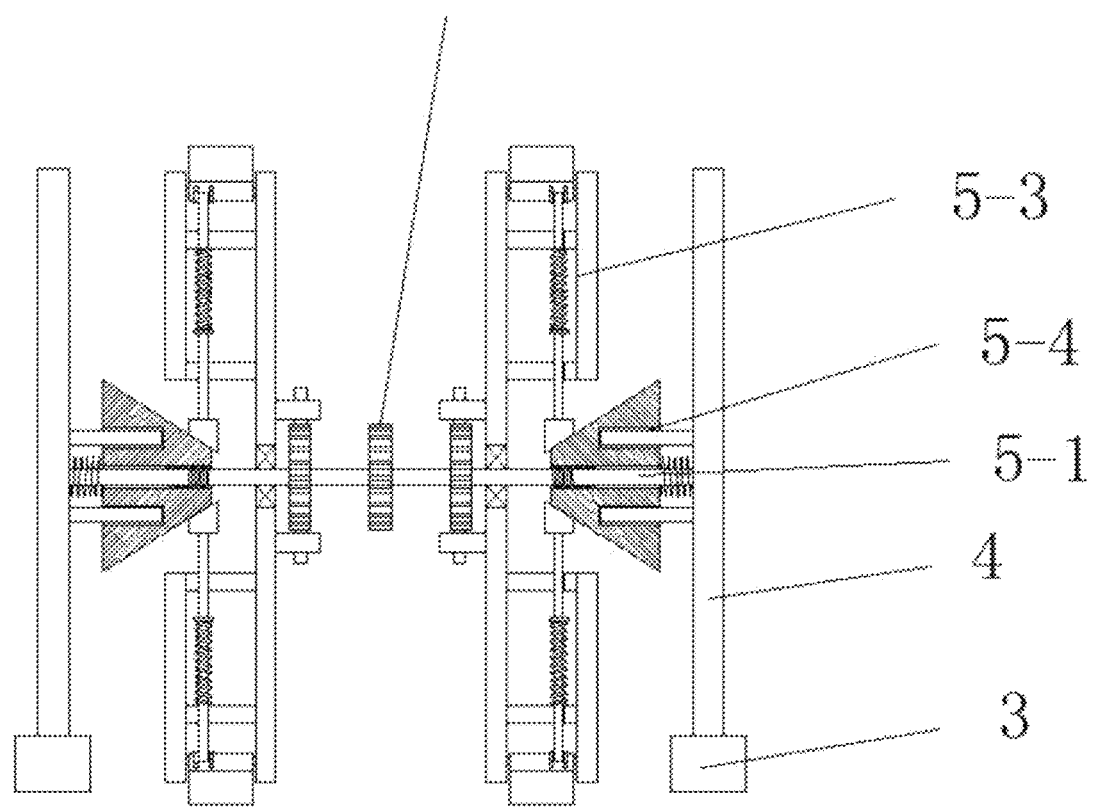
FIG. 3 is a schematic view of a pushing device capable of generating force with an ice surface.
Figure 4:
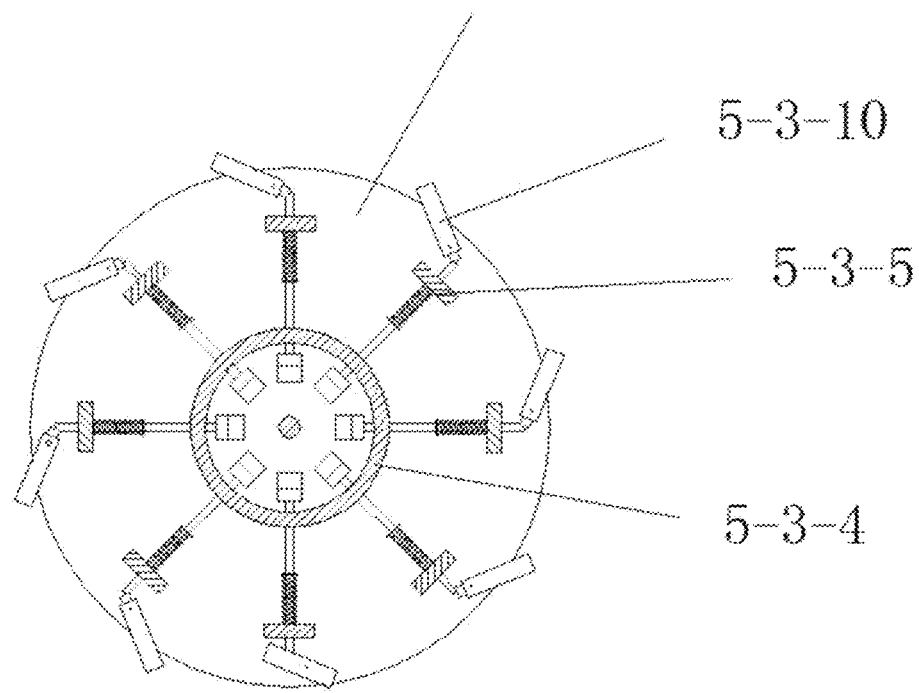
FIG. 4 is a side view of a partial cross section of the pushing device capable of generating the force with the ice surface.
Figure 5:
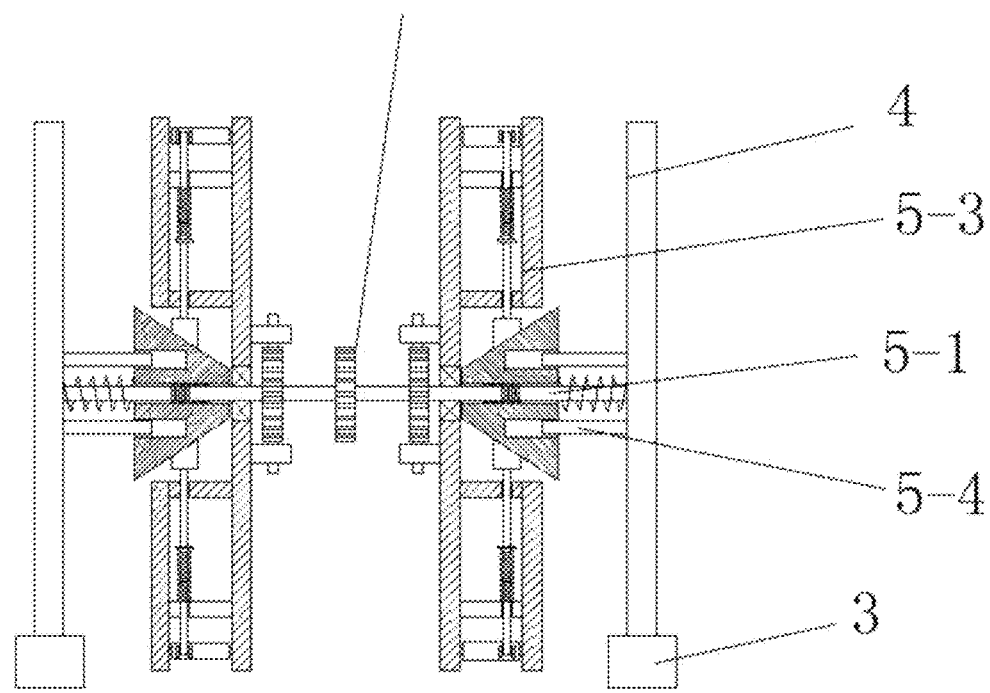
FIG. 5 is a schematic view of the pushing device which does not generate the force with the ice surface.
Figure 6:
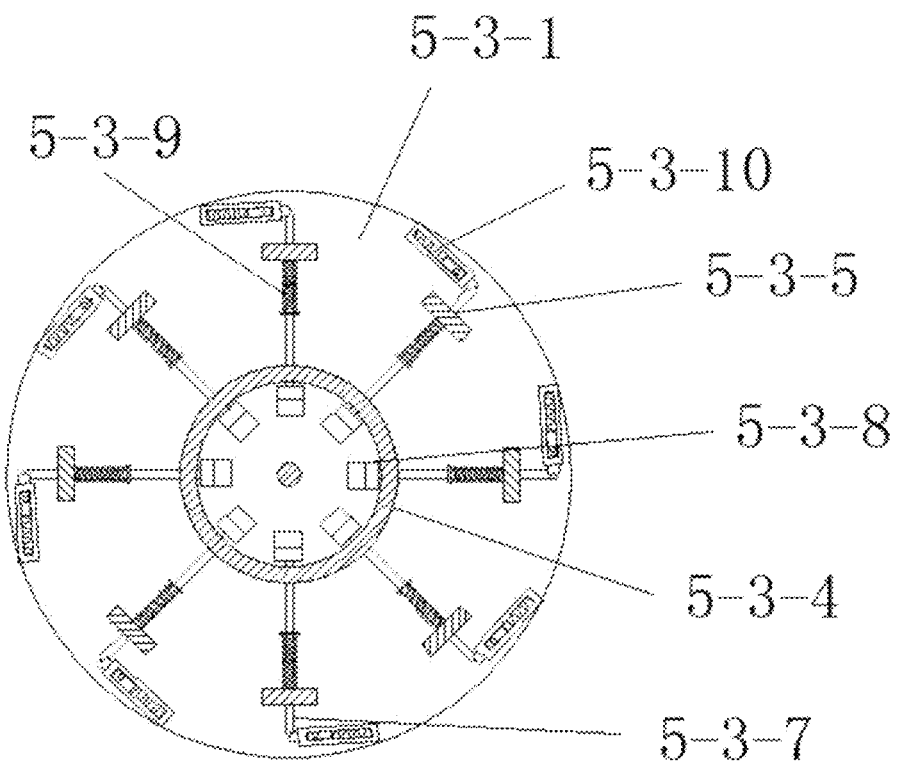
FIG. 6 is a side view of a partial cross section of the pushing device which does not generate the force with the ice surface.
Figure 9:
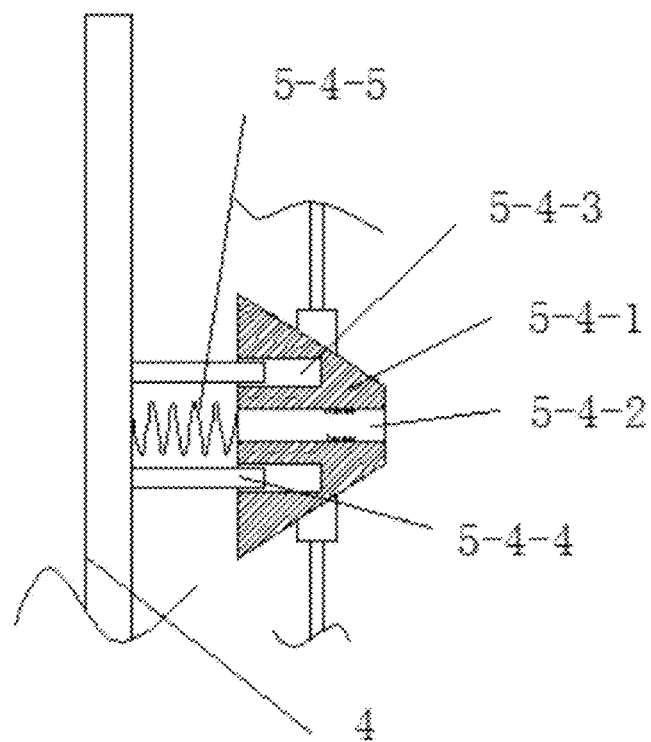
FIG. 9 is a structural schematic view of a positioning device.

Referring to FIGS. 3, 5 and 9, the present embodiment is based on Embodiment 1, and the differences are that the positioning device 5-4 includes a tapered base 5-4-1, limiting rods 5-4-4, and a return spring 5-4-5. A through chamber 5-4-2 is formed in the center of the tapered base 5-4-1. Internal threads are provided in the through chamber 5-4-2, and both sides of the through chamber 5-4-2 are symmetrically provided with limiting chambers 5-4-3. One end of each symmetrical limiting rod 5-4-4 is provided on the H-shaped connecting frame 4, and the limiting chamber 5-4-3 on the other end. The outer side wall of the tapered base 5-4-1 is connected to the H-shaped connecting frame 4 through the return spring 5-4-5 on the rotating shaft 5-1. The inclined side walls of the tapered base 5-4-1 abut against the trapezoidal limiting block 5-3-8.

The elastic force of the return spring 5-4-5 is 0 when the internal threads on the through-chamber 5-4-2 of the tapered base 5-4-1 and the external threads on the rotating shaft 5-1 are abutted, matched and then separated, and the internal threads of the through chamber 5-4-2 are fully matched with the external threads of the rotating shaft 5-1. The position of the tapered base 5-4-1 determines the compression or tension of the return spring 5-4-5.

The internal threads of the through chamber 5-4-2 in the tapered base 5-4-1 abut against the external threads on the rotating shaft 5-1 through pressure action of the return spring 5-4-5. The external threads of the rotating shaft 5-1 are matched with the internal threads of the through chamber 5-4-2 when the rotating shaft 5-1 is rotated clockwise. The tapered base 5-4-1 moves toward the H-shaped connecting frame 4 along the limiting rods 5-4-4 until the internal threads of the through chamber 5-4-2 arrive at the other side of the external threads of the rotating shaft 5-1 and abut against each other under the tension of the return spring 5-4-5. The trapezoidal limiting blocks 5-3-8 move away from the rotating shaft 5-1 under the action of the transmission rod 5-3-7 and the first pressure springs 5-3-9 when the tapered base 5-4-1 moves away from the H-shaped connecting frame, so that the friction members 5-3-10 rotate around the rod shafts and rotate between the disk 5-3-1 and the annular disk 5-3-6 to eliminate the force effect with the ice surface.

The internal threads of the through chamber 5-4-2 in the tapered base 5-4-1 abut against the external threads on the rotating shaft 5-1 through the tension of the return spring 5-4-5. The external threads of the rotating shaft 5-1 are matched with the internal threads of the through chamber 5-4-2 when the rotating shaft 5-1 is rotated counterclockwise. The tapered base 5-4-1 moves toward the H-shaped connecting frame 4 along the limiting rods 5-4-4 until the internal threads of the through chamber 5-4-2 arrive at the other side of the external threads of the rotating shaft 5-1 and abut against each other under the pressure action of the return spring 5-4-5. The trapezoidal limiting blocks 5-3-8 approach the rotating shaft 5-1 under the action of the transmission rod 5-3-7 and the first pressure springs 5-3-9 when the tapered base 5-4-1 moves toward the H-shaped connecting frame 4, so that the friction members 5-3-10 rotate around the rod shafts and are unscrewed from between the disk 5-3-1 and the annular disk 5-3-6 in order to generate the force with the ice surface.

Embodiment 4

Figure 7:
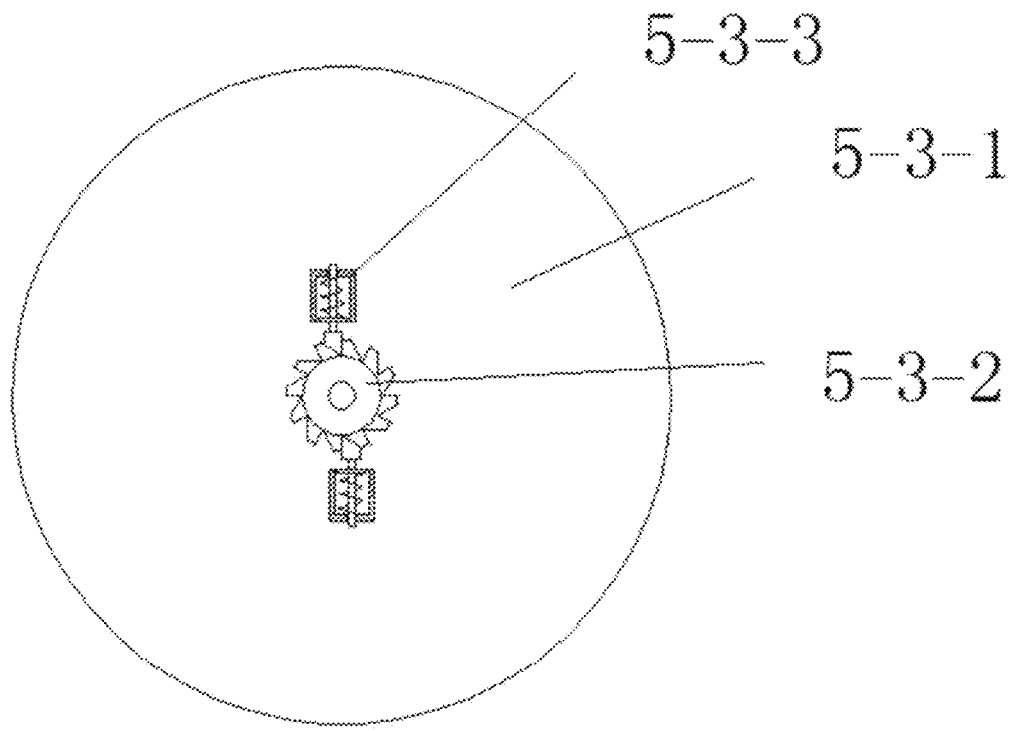
FIG. 7 is a side view of a combination of a disk, a ratchet and limiters.
Figure 8:
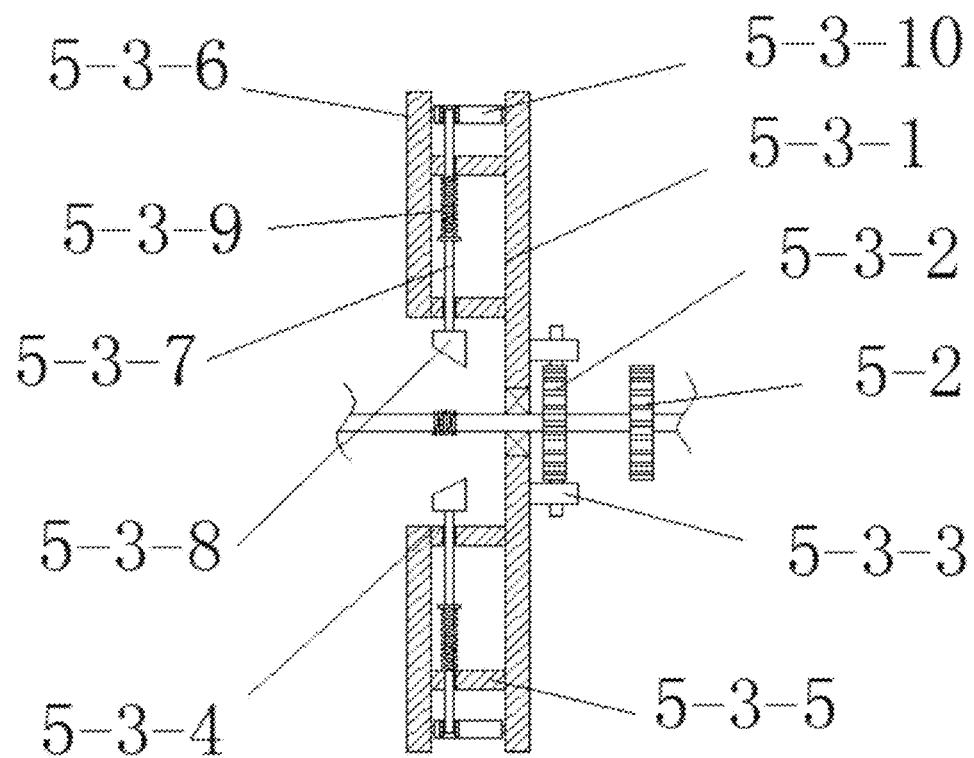
FIG. 8 is a structural schematic view of a rotating device.
Figure 10:
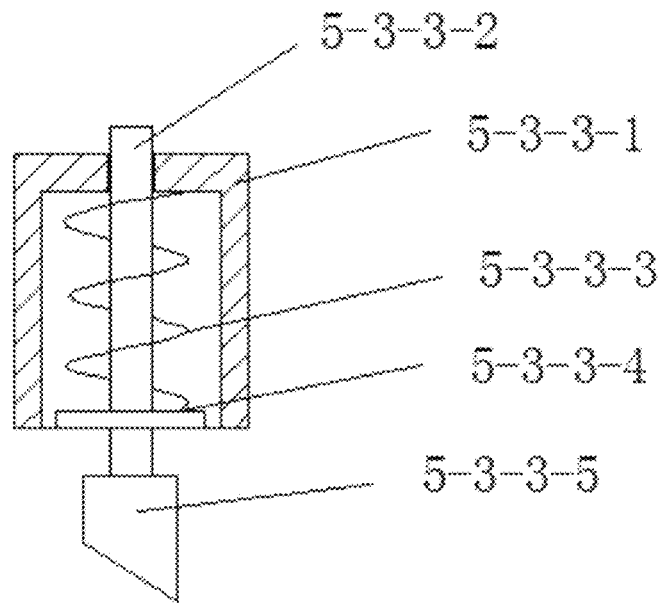
FIG. 10 is a structural schematic view of a limiter.
Figure 11:
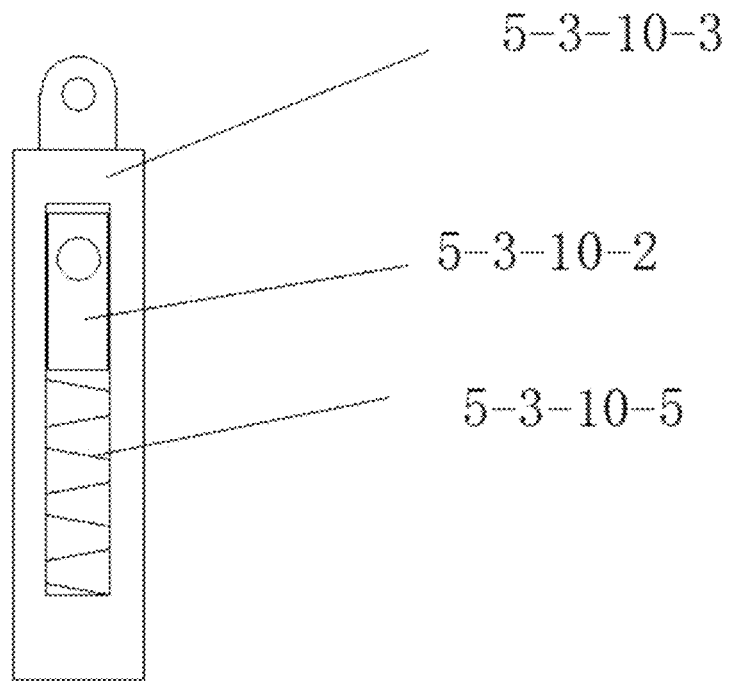
FIG. 11 is a structural side view of a friction member.
Figure 12:
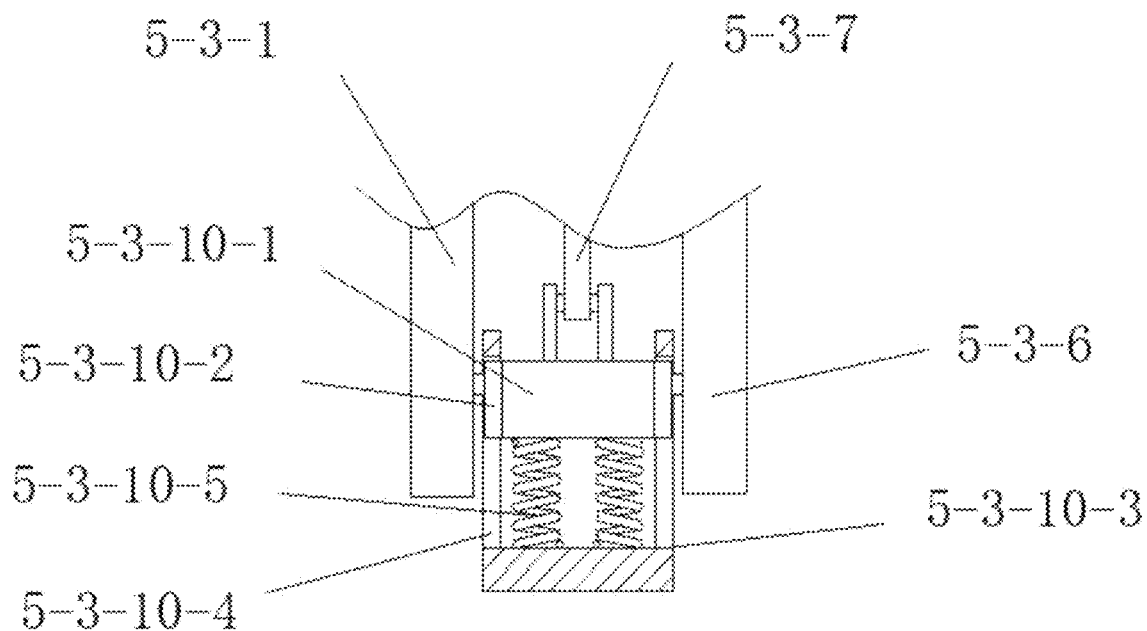
FIG. 12 is a schematic structural view of the friction member.

Referring to FIGS. 7, 8 and 10, the present embodiment is based on Embodiment 2, and the differences are that the limiter 5-3-3 includes a fixing block 5-3-3-1, a connecting rod 5-3-3-2, a second pressure spring 5-3-3-3, a blocking piece 5-3-3-4 and a limiting block 5-3-3-5. The fixing block 5-3-3-1 is provided on the side wall of the disk 5-3-1 and has a groove. The upper end of the groove has a through hole. The connecting rod 5-3-3-2 is movable in the groove and the through hole. The other end of the connecting rod 5-3-3-2 extends through the pressure spring and the blocking piece 5-3-3-4 in the groove and is connected to the limiting block 5-3-3-5 which is matched with the ratchet 5-3-2. Each end of the second pressure spring 5-3-3-3 is connected with the upper wall of the groove and the blocking piece 5-3-3-4 respectively.

The relative displacement of the limiting block 5-3-3-5 and the ratchet 5-3-2 does not occur when the ratchet 5-3-2 is rotated counterclockwise, which forces the ratchet 5-3-2 to rotate counterclockwise the disk 5-3-1 under the action of the limiting block 5-3-3-5. The relative displacement between the limiting block 5-3-3-5 and the ratchet 5-3-2 occurs when the ratchet 5-3-2 rotates clockwise. The limiting block 5-3-3-5 reciprocates up and down under the second pressure spring 5-3-3-3. The ratchet 5-3-2 drives the limiting block 5-3-3-5 to rotate clockwise together.

Embodiment 5

Referring to FIGS. 4, 6, 8, 11 and 12, the present embodiment is based on Embodiment 1, and the differences are that the friction member 5-3-10 includes a slat 5-3-10-1, limiting slats 5-3-10-2, a U-shaped frame 5-3-10-3 and third pressure springs 5-3-10-5. The rod shaft is rotationally provided with the slat 5-3-10-1 and the limiting slats 5-3-10-2. The limiting slats 5-3-10-2 are symmetrical on each side wall of the slat 5-3-10-1. The back-side wall of the slat 5-3-10-1 is connected to the transmission rod 5-3-7 through the hinge seat. The U-shaped frame 5-3-10-3 is movable between the disk 5-3-1 and the annular disk 5-3-6. Both vertical side walls of the U-shaped frame 5-3-10-3 are provided with strip-shaped chambers 5-3-10-4 in which the limiting slats 5-3-10-2 are movable. The front side wall of the slat 5-3-10-1 is connected to the bottom inner wall of the U-shaped frame 5-3-10-3 by the symmetrical third pressure springs 5-3-10-5.

The thickness of the slat 5-3-10-1 is greater than the thickness of the limiting slat 5-3-10-2.

The friction member 5-3-10 rotates the slat 5-3-10-1 to around the rod shaft by the transmission rod 5-3-7 through the hinge seat. The positions of the trapezoidal limiting block 5-3-8 and the transmission rod 5-3-7 are determined after the position of the tapered base 5-4-1 is stabilized. The transmission rod 5-3-7 fixes the position and angle of the slat 5-3-10-1. It is possible to control the U-shaped frame 5-3-10-3 screwed or unscrewed between the disk 5-3-1 and the annular disk 5-3-6. The distance to the ice surface first becomes smaller and then becomes larger before contacting the ice surface when the U-shaped frame 5-3-10-3 is unscrewed between the disk 5-3-1 and the annular disk 5-3-6. Both vertical side walls of the U-shaped frame 5-3-10-3 are provided with strip-shaped chambers 5-3-10-4. The limiting slats 5-3-10-2 are matched with the strip-shaped chambers 5-3-10-4 to enable the U-shaped frame 5-3-10-3 to move free along the direction of the slat 5-3-10-1 in order to adapt to the change of the distance between the friction member 5-3-10 and the ice surface. Meanwhile, under the action of the third pressure springs 5-3-10-5. The adaptability to the distance change of the friction member 5-3-10 and the effect of the force with the ice surface are ensured. The force exists from contacting the ice surface until separating from the ice surface, which provides maximum power for the sliding tool.

The thickness of the slat 5-3-10-1 is greater than the thickness of the limiting slat 5-3-10-2 in order to ensure stable activity of the U-shaped frame 5-3-10-3 along the direction of the limiting slats 5-3-10-2.

Embodiment 6

Figure 13:
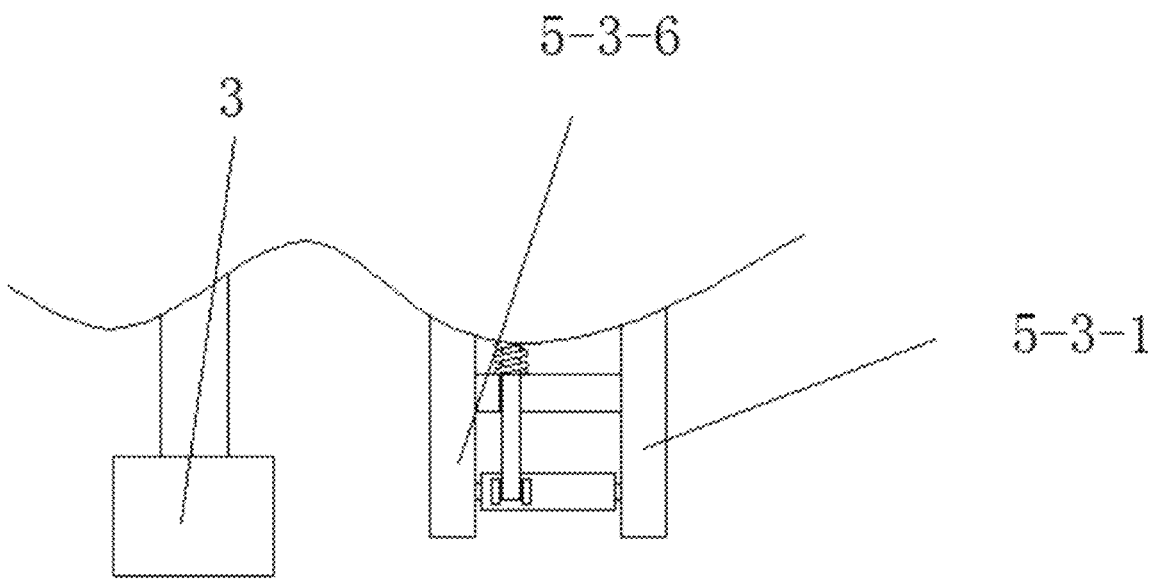
FIG. 13 is a schematic view of Embodiment 6.

Referring to FIG. 13, the present embodiment is based on Embodiment 2, and the difference is that the lowest points of the disk 5-3-1 and the annular disk 5-3-6 are higher than the lower end surface of the sliding plates 3 to prevent the disk 5-3-1 and the annular disk 5-3-6 from causing friction with the ice surface during rotation.

Embodiment 7

A sliding method on ice-surface disclosed in the present embodiment is applied to the ice-surface sliding tool according to Embodiments 1 to 6, and includes the following steps.

Step a. The tool is placed on the ice surface, and the user sits on the seat board 1 with two feet off the ice surface and the two hands holding the rotating rod of the hand-operated chain wheel 6.

Step b. The hand-operated chain wheel 6 is counterclockwise rotated and accelerated by hands to drive the chain and rotate counterclockwise the chain wheel 5-2 via the reversing action of the reversing gear 7. The chain wheel 5-2 rotates counterclockwise the ratchet 5-3-2 via the rotating shaft 5-1. The disk 5-3-1 is rotated counterclockwise under the limitation of limiter 5-3-3 to the ratchet 5-3-2, and rotates counterclockwise the transmission rods 5-3-7 and the friction members 5-3-10 via the cylinder 5-3-4, the connecting plates 5-3-5 and the annular disk 5-3-6.

Step c. The internal threads of the through chamber 5-4-2 in the tapered base 5-4-1 abut against the external threads on the rotating shaft 5-1 which has not yet rotated through the tension of the return spring 5-4-5 in order to restrict the tapered base 5-4-1 to move toward the H-shaped connecting frame 4. The tapered base 5-4-1 moves toward the H-shaped connecting frame 4 along the limiting rods 5-4-4 until the internal threads of the through chamber 5-4-2 arrive at the other side of the external threads of the rotating shaft 5-1 and abut against each other under the action of the return spring 5-4-5 when the external threads of the rotating shaft 5-1 rotating counterclockwise are matched with the internal threads of the through chamber 5-4-2. The trapezoidal limiting blocks 5-3-8 approach the rotating shaft 5-1 under the disk 5-3-1 and the first pressure springs 5-3-9 when the tapered base 5-4-1 moves toward the H-shaped connecting frame 4, so that the friction members 5-3-10 rotate around the rod shafts. The friction ends of the friction members 5-3-10 are unscrewed between the disk 5-3-1 and annular disk 5-3-6. The outermost ends of the unscrewed friction members 5-3-10 rotate the friction members 5-3-10 to generate force with the ice surface through counterclockwise rotation of the rotating shaft 5-1. The rotation of the friction members 5-3-10 provides power for the tool and the speed of the sliding tool gradually increases from 0 to accelerate the sliding when the linear speed of the friction members 5-3-10 during action with the ice surface is greater than that of the sliding speed of the tool.

Step d. The friction members 5-3-10 continue to rotate counterclockwise with the disk 5-3-1 and the annular disk 5-3-6 by inertia and generate the force with the ice surface when the tool is needed to slide after the speed increases for a period of time. The rotation of the friction members 5-3-10 stops to provide power for the tool but provide resistance instead when the linear speed of the friction members 5-3-10 during action with the ice surface is less than that of the sliding speed of the tool. The hand-operated chain wheel 6 is rotated clockwise by hands to drive the chain and rotate clockwise the chain wheel 5-2 through the reversing action of the reversing gear 7. The chain wheel 5-2 rotates clockwise the ratchet 5-3-2 via the rotating shaft 5-1. The limiters 5-3-3 stops to restrict the ratchet 5-3-2 to rotating clockwise, and the disk 5-3-1 and the friction members 5-3-10 continue to rotate counterclockwise by inertia.

Step e. The internal threads of the through chamber 5-4-2 in the tapered base 5-4-1 abut against the external threads on the rotating shaft 5-1 through the pressure action of the return spring 5-4-5. The external threads of the rotating shaft 5-1 which rotates clockwise are matched with the internal threads of the through chamber 5-4-2. The tapered base 5-4-1 moves away from the H-shaped connecting frame 4 along the limiting rods 5-4-4 until the internal threads of the through chamber 5-4-2 arrive at the other side of the external threads of the rotating shaft 5-1 and abut against each other under the action of the return spring 5-4-5. The trapezoidal limiting blocks 5-3-8 move away from the rotating shaft 5-1 under the action of disk 5-3-1 and the first pressure springs 5-3-9 when the tapered base 5-4-1 moves away from the H-shaped connecting frame 4, so that the friction members 5-3-10 rotate around the rod shafts, and the friction ends of the friction members 5-3-10 rotate between the disk 5-3-1 and the annular disk 5-3-6, thereby releasing the force between the rotating friction members 5-3-10 and the ice surface, and eliminating the resistance for the sliding tool to prolong the sliding time.

Step f. The hand-operated chain wheel 6 is slowly rotated counterclockwise by hands to drive the chain and rotate counterclockwise the chain wheel 5-2 through the reversing action of the reversing gear 7 when the sliding tool needs to be decelerated in emergency. The chain wheel 5-2 rotates counterclockwise the ratchet 5-3-2 via the rotating shaft 5-1. The disk 5-3-1 is rotated counterclockwise under the limitation of the limiters 5-3-3 to the ratchet 5-3-2 and rotates counterclockwise the transmission rods 5-3-7 and the friction members 5-3-10 through the cylinder 5-3-4, the connecting plates 5-3-5 and the annular disk 5-3-6. The external threads of the rotating shaft 5-1 rotating counterclockwise are matched with the internal threads of the through chamber 5-4-2. The tapered base 5-4-1 moves toward the H-shaped connecting frame 4 along the limiting rods 5-4-4 until the internal threads of the through chamber 5-4-2 arrive at the other side of the external threads of the rotating shaft 5-1 and abut against each other under the action of the return springs 5-4-5. The trapezoidal limiting blocks 5-3-8 approach the rotating shaft 5-1 under the action of the disk 5-3-1 and the first pressure spring 5-3-9 when the tapered base 5-4-1 moves toward the H-shaped connecting frame 4, so that the friction members 5-3-10 rotate around the rod shafts, and the friction ends of the friction members 5-3-10 are unscrewed between the disk 5-3-1 and the annular disk 5-3-6 to generate the force with the ice surface. The rotation of the friction members 5-3-10 stops to provide power for the tool but provide resistance instead to decelerate the sliding tool when the linear speed of the friction members 5-3-10 during action with the ice surface is less than the sliding speed of the tool by slowly rotating the hand-operated chain wheel 6.

Embodiment 8

An accelerated sliding method on ice-surface disclosed in the present embodiment is applied to the ice-surface sliding tool according to Embodiments 1 to 6. The hand-operated chain wheel 6 is rotated counterclockwise and accelerated by hands to drive the chain and rotate counterclockwise the chain wheel 5-2 through the reversing action of the reversing gear 7. The chain wheel 5-2 rotates counterclockwise the ratchet 5-3-2 through the rotating shaft 5-1. The disk 5-3-1 is rotated counterclockwise under the limitation of the limiters 5-3-3 to the ratchet 5-3-2 and rotates counterclockwise the transmission rods 5-3-7 and the friction members 5-3-10 through the cylinder 5-3-4, the connecting plates 5-3-5 and the annular disk 5-3-6.

Embodiment 9

The accelerated sliding method on ice-surface disclosed in the present embodiment is applied to the ice-surface sliding tool according to Embodiments 1 to 6. The internal threads of the through chamber 5-4-2 in the tapered base 5-4-1 abut against the external threads on the rotating shaft 5-1 which has not yet rotated through the tension of the return spring 5-4-5 in order to restrict the tapered base 5-4-1 to moving toward the H-shaped connecting frame 4. The tapered base 5-4-1 moves toward the H-shaped connecting frame 4 along the limiting rods 5-4-4 until the internal threads of the through chamber 5-4-2 arrive at the other side of the external threads of the rotating shaft 5-1 and abut against each other under the action of the return spring 5-4-5 when the external threads of the rotating shaft 5-1 rotating counterclockwise are matched with the internal threads of the through chamber 5-4-2. The trapezoidal limiting blocks 5-3-8 approach the rotating shaft 5-1 under the action of the disk 5-3-1 and the first pressure springs 5-3-9 when the tapered base 5-4-1 moves toward the H-shaped connecting frame 4, so that the friction members 5-3-10 rotate around the rod shafts, and the friction ends of the friction members 5-3-10 are unscrewed between the disk 5-3-1 and the annular disk 5-3-6. The outermost ends of the unscrewed friction members 5-3-10 drive the friction members 5-3-10 which are rotated to generate the force with the ice surface through counterclockwise rotation of the rotating shaft 5-1. The rotation of the friction members (5-3-10) provides power for the tool and the speed of the sliding tool gradually increases from 0 to accelerate sliding when the linear speed of the friction members 5-3-10 during the action with the ice surface is greater than the sliding speed of the tool.

Embodiment 10

An inertial sliding method on ice-surface disclosed by the present embodiment is applied to the ice-surface sliding tool according to Embodiments 1 to 6. The friction members 5-3-10 continue to rotate counterclockwise with the disk 5-3-1 and the annular disk 5-3-6 due to the inertia and generate the force with the ice surface. The rotation of the friction members 5-3-10 stops to provide power for the tool but provide resistance instead when the linear speed of the friction members 5-3-10 during the action with the ice surface is less than the sliding speed of the tool. The hand-operated chain wheel 6 is quickly rotated clockwise by hands at this time to drive the chain and rotate clockwise the chain wheel 5-2 through the reversing action of the reversing gear 7. The chain wheel 5-2 rotates clockwise the ratchet 5-3-2 through the rotating shaft 5-1. The limiters 5-3-3 cannot restrict the ratchet 5-3-2 from rotating clockwise, and the disk 5-3-1 and the friction members 5-3-10 continue to rotate counterclockwise at this time due to the inertia.

Embodiment 11

The inertial sliding method on ice-surface disclosed by the present embodiment is applied to the ice-surface sliding tool according to Embodiments 1 to 6. The internal threads of the through chamber 5-4-2 in the tapered base 5-4-1 abut against the external threads provided on the rotating shaft 5-1 through the pressure action of the return spring 5-4-5. The external threads of the rotating shaft 5-1 are matched with the internal threads of the through chamber 5-4-2 when the rotating shaft 5-1 is rotated clockwise. The tapered base 5-4-1 moves away from the H-shaped connecting frame 4 along the limiting rods 5-4-4 until the internal threads of the through chamber 5-4-2 arrive at the other side of the external threads of the rotating shaft 5-1 and abut against each other under the action of the return spring 5-4-5. The trapezoidal limiting blocks 5-3-8 move away from the rotating shaft 5-1 under the action of the disk 5-3-1 and the first pressure springs 5-3-8 when the tapered base 5-4-1 moves away from the H-shaped connecting frame 4, so that the friction members 5-3-10 rotate around the rod shafts, and the friction ends of the friction members 5-3-10 rotate between the disk 5-3-1 and the annular disk 5-3-6, thereby releasing the force action generated between the rotating friction members 5-3-10 and the ice surface, and releasing resistance for the sliding tool to prolong sliding time.

Embodiment 12

An emergent deceleration method for ice-surface sliding disclosed by the present embodiment is applied to the ice-surface sliding tool according to Embodiments 1 to 6. The hand-operated chain wheel 6 is rotated counterclockwise by hands to drive the chain and rotate counterclockwise the chain wheel 5-2 through the reversing action of the reversing gear 7. The chain wheel 5-2 rotates counterclockwise the ratchet 5-3-2 to through the rotating shaft 5-1. The disk 5-3-1 is rotated counterclockwise under the limitation of the limiters 5-3-3 to the ratchet 5-3-2 and rotates counterclockwise the transmission rod 5-3-7 and the friction members 5-3-10 through the cylinder 5-3-4, the connecting plates 5-3-5 and the annular disk 5-3-6. The external threads of the rotating shaft 5-1 rotating counterclockwise are matched with the internal threads of the through chamber 5-4-2. The tapered base 5-4-1 moves toward the H-shaped connecting frame 4 along the limiting rods 5-4-4 until the internal threads of the through chamber 5-4-2 arrive at the other side of the external threads of the rotating shaft 5-1 and abut against each other under the action of the return spring 5-4-5. The trapezoidal limiting blocks 5-3-8 approach the rotating shaft 5-1 under the action of the disk 5-3-1 and the first pressure springs 5-3-9 when the tapered base 5-4-1 moves toward the H-shaped connecting frame 4, so that the friction members 5-3-10 rotate around the rod shafts, and the friction ends of the friction members 5-3-10 are unscrewed between the disk 5-3-1 and the annular disk 5-3-6 to generate the force with the ice surface. The rotation of the friction members 5-3-10 cannot provide power for the tool but provide resistance instead to decelerate the sliding tool when the linear speed of the friction members 5-3-10 during the action with the ice surface is less than the sliding speed of the tool by rotating the hand-operated chain wheel 6.

The above embodiments are only exemplary illustrations of the present patent and do not limit the scope thereof, and also can be partly changed by those skilled in the art. All embodiments without departing from the spirit of the patent are within the scope of the present patent.

What is claimed is:

1. A method of driving a sliding tool on ice-surface, the method comprising:
    step a): placing a tool on an ice surface, and
        making a user sit on a seat board with hands holding a rotating rod of a hand-operated chain wheel;
    step b): rotating counterclockwise and accelerating the hand-operated chain wheel to drive a chain, rotating counterclockwise a chain wheel via a reversing action of a reversing gear to rotate counterclockwise a ratchet via a rotating shaft, rotating counterclockwise a disk under limitation of limiters to the ratchet, and driving transmission rods and friction members to rotate counterclockwise via a cylinder, connecting plates, and an annular disk;

step c): abutting internal threads of a through chamber in a tapered base against external threads on the rotating shaft which has not yet rotated through a tension of a return spring in order to restrict the tapered base to move toward an H-shaped connecting frame, wherein the external threads of the rotating shaft match with the internal threads of the through chamber when the rotating shaft is rotated counterclockwise, moving the tapered base toward the H-shaped connecting frame along limiting rods until the internal threads of the through chamber arrive at an outer side of the external threads of the rotating shaft and abut against each other under the return spring, approaching trapezoidal limiting blocks to the rotating shaft under the disk and first pressure springs when the tapered base moves toward the H-shaped connecting frame, making the friction members rotate around rod shafts and friction ends of the friction members be deployed between the disk and the annular disk, and rotating the friction members to generate force with an ice surface via outermost ends of the deployed friction members through the counterclockwise rotation of the rotating shaft, wherein the rotation of the friction members provides power for the tool, and a speed of the tool gradually increases from 0 to accelerate the sliding tool when a linear speed of the friction members with respect to the ice surface is greater than the speed of the tool;

step d): continuing rotating counterclockwise the friction members with the disk and the annular disk by inertia and generating the force with the ice surface to slide the tool after the speed increases for a period of time, rotating clockwise the hand-operated chain wheel to drive the chain and rotate clockwise the chain wheel through the reversing action of the reversing gear when the rotation of the friction members stops to provide power for the tool but provide resistance instead and the linear speed of the friction members with respect to the ice surface is less than the speed of the tool, and allowing the chain wheel to rotate the ratchet clockwise via the rotating shaft, wherein the ratchet is unable to restrict the limiters to rotate clockwise, whereby the disk and the friction members continue to rotate counterclockwise by inertia;

step e): rotating clockwise the rotating shaft whose external threads are matched with the internal threads of the through chamber when the internal threads of the through chamber in the tapered base abut against the external threads on the rotating shaft via the pressure of the return spring, moving the tapered base away from the H-shaped connecting frame along the limiting rods until the internal threads of the through chamber arrive at an inner side of the external threads of the rotating shaft and abut against each other under the return spring, moving the trapezoidal limiting blocks away from the rotating shaft under the disk and the first pressure springs when the tapered base moves away from the H-shaped connecting frame, and making the friction members rotate around the rod shafts and the friction ends of the friction members be retracted between the disk and the annular disk, thereby releasing the force between the rotating friction members and the ice surface, and eliminating the resistance for the tool to prolong sliding; and step f): rotating counterclockwise the hand-operated chain wheel to decelerate the tool in emergency to drive the chain and rotate counterclockwise the chain wheel through the reversing action of the reversing gear, allowing the chain wheel to rotate the ratchet counterclockwise via the rotating shaft, rotating counterclockwise the disk under the limitation of the limiters to the ratchet, rotating counterclockwise the transmission rods and the friction members via the cylinder, the connecting plates, and the annular disk, rotating counterclockwise the rotating shaft, the external threads of which are matched with the internal threads of the through chamber, moving the tapered base toward the H-shaped connecting frame along the limiting rods until the internal threads of the through chamber arrive at the outer side of the external threads of the rotating shaft as well as the internal threads of the through chamber and the external threads of the rotating shaft abut against each other under the action of the return spring, approaching the trapezoidal limiting blocks to the rotating shaft under the action of the disk and the first pressure springs when the tapered base moves toward the H-shaped connecting frame, and making the friction members rotate around the rod shafts and the friction ends of the friction members be deployed between the disk and the annular disk, thereby generating the force with the ice surface; wherein when the linear speed of the friction members with respect to the ice surface is less than the speed of the tool by rotating the hand-operated chain wheel, and the rotation of the friction members stops to provide power for the tool but provide resistance instead to decelerate the tool.

2. A method of accelerating a sliding tool on ice-surface, the method comprising:

abutting internal threads of a through chamber in a tapered base against external threads on a rotating shaft which has not yet rotated through a tension of a return spring in order to restrict the tapered base to move toward an H-shaped connecting frame, wherein the external threads of the rotating shaft are matched with the internal threads of the through chamber when the rotating shaft is rotated counterclockwise;

moving the tapered base toward the H-shaped connecting frame along limiting rods until the internal threads of the through chamber arrive at an outer side of the external threads of the rotating shaft and abut against each other under the return spring;

approaching trapezoidal limiting blocks to the rotating shaft under the disk and the first pressure springs when the tapered base moves toward the H-shaped connecting frame;

making friction members rotate around rod shafts and friction ends of the friction members be deployed between the disk and an annular disk; and rotating the friction members to generate force with an ice surface via outermost ends of the deployed friction members through counterclockwise rotation of the rotating shaft, wherein rotation of the friction members provides power for the sliding tool, and a speed of the sliding tool gradually increases from 0 to accelerate the sliding tool when a linear speed of the friction members with respect to the ice surface is greater than the speed of the sliding tool.

3. A sliding tool used on an ice surface, the sliding tool comprising:
a seat board, a U-shaped rod, sliding plates, H-shaped connecting frames, a pushing device, a hand-operated chain wheel, and a reversing gear, wherein:
one end of an upper surface of the seat board is provided with a backrest;
the U-shaped rod is provided on a side wall of the other end of the seat board;
a lower surface of the seat board is symmetrically provided with two of the sliding plates in parallel to each other, and the sliding plates are connected with the lower surface of the seat board through the H-shaped connecting frames;
the pushing device is rotationally provided between two of the H-shaped connecting frames; and
the hand-operated chain wheel is provided on an upper end of the U-shaped rod through a support bar, and is connected with the pushing device through a chain running through the U-shaped rod and matching with the reversing gear;
wherein a manual counterclockwise rotation of the hand-operated chain wheel drives the pushing device to provide power for the sliding tool during acceleration phase; and a manual clockwise rotation of the hand-operated chain wheel eliminates a resistance caused by the pushing device for the sliding tool during sliding phase;
wherein the pushing device includes a rotating shaft, a chain wheel, rotating devices and positioning devices, wherein:
the rotating shaft is rotationally provided on the two H-shaped connecting frames;
positive and negative external threads are symmetrically provided on the rotating shaft;
the chain wheel, the rotating devices and the positioning devices are arranged on the rotating shaft;
both ends of the chain wheel are outwardly provided with the rotating devices and the positioning devices in turn and in a symmetrical manner;
first ends of the positioning devices are connected to the H-shaped connecting frames, and second ends of the positioning devices are matched with the rotating devices; and
the rotating devices rotate with the rotating shaft counterclockwise, and are unable to rotate with the rotating shaft clockwise;
a distance between two of the positioning devices is controlled by controlling a rotation direction of the rotating shaft;
wherein a counterclockwise rotation of the rotating shaft increases the distance between the two symmetrically provided positioning devices, and the increased distance between the positioning devices causes the rotating devices to enhance force between the rotating devices and the ice surface so as to provide power for the sliding tool; and wherein a clockwise rotation of the rotating shaft decreases the distance between the two symmetrically provided positioning devices, and the decreased distance between the positioning devices causes the rotating devices to eliminate the force between the rotating devices and the ice surface so as to reduce resistance for the sliding tool.

4. The sliding tool of claim 3, wherein each of the rotating devices includes a disk, a ratchet, limiters, a cylinder, connecting plates, an annular disk, transmission rods, trapezoidal limiting blocks, first pressure springs and friction members, wherein:
the disk is provided on the rotating shaft through a bearing;
the ratchet is provided between the disk and the rotating shaft;
two of the limiters are symmetrically provided around a center of an inner side wall of the disk and are matched with the ratchet;
an outer side wall of the disk is connected to the annular disk through the cylinder, the connecting plates, and rod shafts;
the connecting plates are provided on the outer side wall of the disk to form an annular array;
a plurality of through holes that are formed as an array on a side wall of the cylinder correspond with through holes that are provided on the connecting plates;
first ends of the transmission rods are connected to the trapezoidal limiting blocks, and second ends of the transmission rods pass through the first pressure springs to connect to the friction members through a hinge seat;
the friction members are rotationally provided on the rod shafts; and
first ends of the first pressure springs are connected to the connecting plates, and second ends of the first pressure springs are connected to a limiting piece on the transmission rods.

5. The sliding tool of claim 4, wherein each of the limiters includes a fixing block, a connecting rod, a second pressure spring, a blocking piece and a limiting block, wherein:
the fixing block is provided on the outer side wall of the disk and has a groove;
an upper wall of the groove has a through hole;
the connecting rod is movable in the groove and the through hole;
an end of the connecting rod extends through the second pressure spring and the blocking piece in the groove and is connected to the limiting block which is matched with the ratchet; and
each end of the second pressure spring is connected with the upper wall of the groove and the blocking piece respectively.

6. The sliding tool of claim 4, wherein each of the friction members includes a slat, limiting slats, a U-shaped frame and third pressure springs, wherein:
each of the rod shafts is rotationally provided with the slat and the limiting slats;
the limiting slats are symmetrically provided on each side wall of the slat;
a back-side wall of the slat is connected to the transmission rod through the hinge seat;
the U-shaped frame is movable between the disk and the annular disk;
both vertical side walls of the U-shaped frame are provided with strip-shaped chambers in which the limiting slats are movable; and a front side wall of the slat is connected to a bottom inner wall of the U-shaped frame by the third pressure springs.

7. The sliding tool of claim 3, wherein each of the positioning devices includes a tapered base, limiting rods, and a return spring, wherein:
   a center of the tapered base is provided with a through chamber;
   the through chamber has internal threads inside;
   limiting chambers are symmetrically provided on each side of the through chamber;
   each of the limiting rods which are symmetrically provided in parallel to each other has the H-shaped connecting frame at one end and the limiting chamber at the other end; and
   an outer side wall of the tapered base is connected to the H-shaped connecting frame through the return spring on the rotating shaft, and inclined side walls of the tapered base abut against trapezoidal limiting blocks.

\* \* \* \* \*